(12) United States Patent
Dodd

(10) Patent No.: US 7,407,365 B2
(45) Date of Patent: Aug. 5, 2008

(54) COOLING ARRANGEMENT

(75) Inventor: Alec George Dodd, Derby (GB)

(73) Assignee: Rolls-Royce PLC, London (GB)

( * ) Notice: Subject to any disclaimer, the term of this patent is extended or adjusted under 35 U.S.C. 154(b) by 622 days.

(21) Appl. No.: 11/067,637

(22) Filed: Feb. 28, 2005

(65) Prior Publication Data

US 2005/0214118 A1  Sep. 29, 2005

(30) Foreign Application Priority Data

Mar. 25, 2004 (GB) ................ 0406692.4

(51) Int. Cl.
*F01D 5/14* (2006.01)
(52) U.S. Cl. ..................... 415/115; 416/97 R
(58) Field of Classification Search ............... 416/97 R; 415/115
See application file for complete search history.

(56) References Cited

U.S. PATENT DOCUMENTS

| 4,118,145 A | 10/1978 | Stahl |
| 4,137,619 A | 2/1979 | Beltran et al. |
| 4,179,240 A * | 12/1979 | Kothmann ................ 416/96 R |
| 4,529,357 A | 7/1985 | Holland |
| 5,122,033 A * | 6/1992 | Paul ......................... 416/96 R |
| 6,932,571 B2 * | 8/2005 | Cunha et al. ............. 416/97 R |
| 2002/0080563 A1 | 6/2002 | Pence et al. |

FOREIGN PATENT DOCUMENTS

WO   WO 01/95688 A1   12/2001

\* cited by examiner

*Primary Examiner*—Edward Look
*Assistant Examiner*—Devin Hanan
(74) *Attorney, Agent, or Firm*—Oliff & Berridge, PLC

(57) ABSTRACT

The present invention relates to a cooling arrangement in which a fractal passage network is provided incorporating several passage stages. Each passage stage 4, 5, 6, 7 has substantially the same passage cross-section for consistency with other passage stages to facilitate flow pressure control across the fractal passage network. Normally, the length of passages in each passage stage are also specifically determined in order to achieve a consistent flow pressure control. The arrangement is particularly utilized with regard to cooling within turbine engine components such as blade aerofoils.

10 Claims, 1 Drawing Sheet

COOLING ARRANGEMENT

Figure 1:
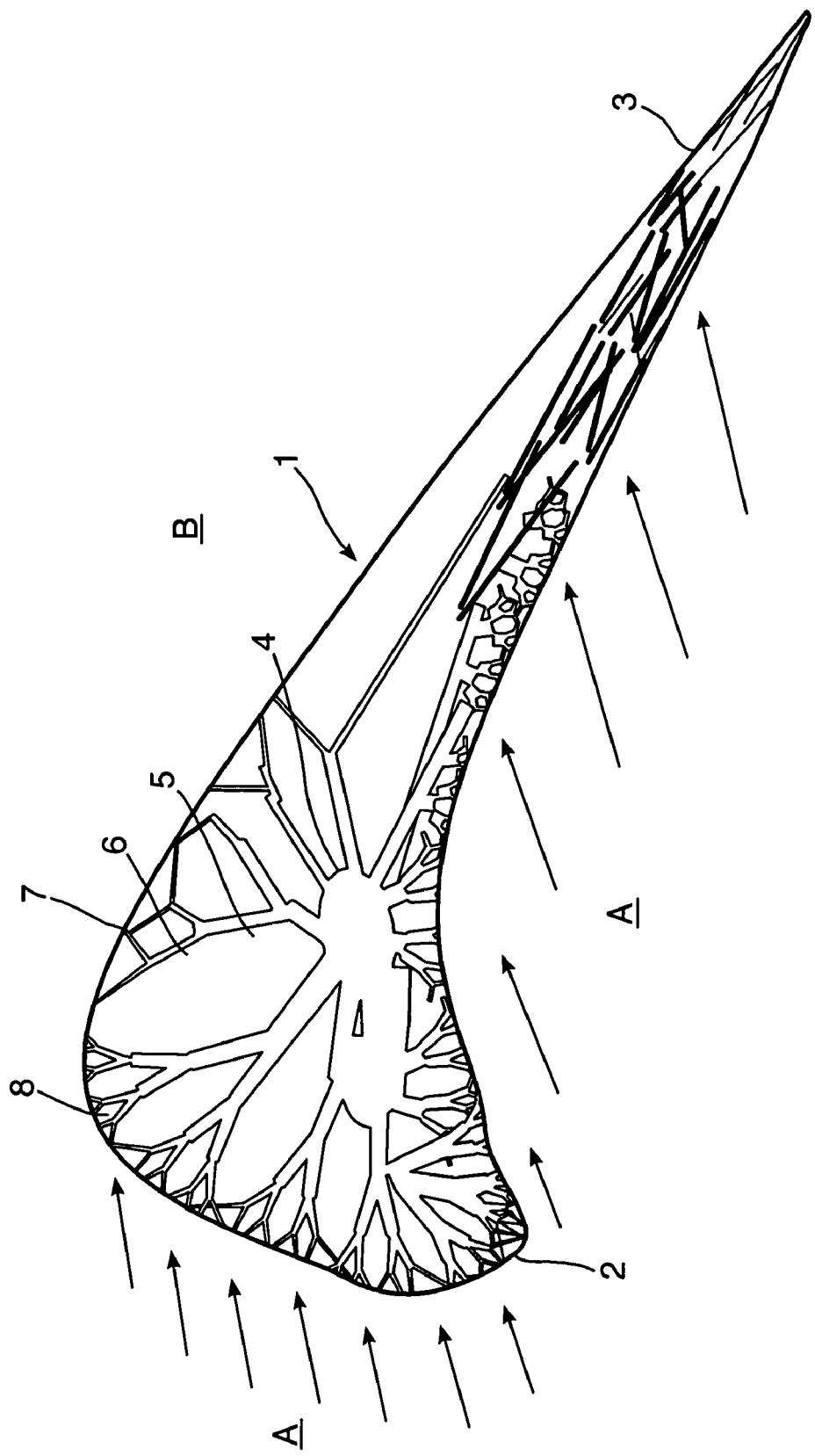

The present invention relates to cooling arrangements and more particularly to cooling arrangements with respect to aerofoils in contact with the main gas stream in a turbine engine.

Higher operating temperatures are desirable in order to achieve higher turbine engine efficiencies. Unfortunately there are physical limitations with respect to melting points and structural integrity of the component parts. In such circumstances it is highly important to achieve good cooling with respect to aerofoils and other parts in contact with the main gas stream in a turbine engine. Typically, this main gas stream will have a temperature in the order of 1600° C. with peaks as high as 1800° C., but the component parts may only be able to withstand temperatures in the range 750° C. to 1,050° C. dependent upon mechanical and thermal stresses. Normally coolant air will enter a cooling arrangement within such components at a temperature of around 600° C. Furthermore, consideration must be made with respect to the pressure ratio between the cooling feed supply and the aerofoil surface which will generally be subject to differing pressure regions. Some regions such as the leading edge will be subject to relatively high pressure whilst other parts will be subject to significantly lower aerodynamic pressures and even suction through negative pressures. In such circumstances, it is important that the low pressure regions do not drain coolant air flow from the high pressure regions or even worse induce hot gas ingestion through the coolant flow outlet apertures.

Previously, tooling arrangements have used long thin radial passages. These radial passages are good for minimising pressure drop and provide adequate convection heat exchange surface area, but achieve low levels of cooling per coolant passage length. Furthermore, cooling air quickly heats up to reduce the cooling effect. Practically, the maximum cooling and mechanical limit for such passages is between 30 to 50 to 1 in terms of length to diameter ratio. Furthermore, when due care is taken with respect to dust blockage avoidance, it is necessary to ensure that the minimum diameter of the coolant passage is 0.5 millimetres, so that for best effect passages must exit after 20 millimetres or so. Such a 20 millimetre passage length is relatively short in the radial direction for blades with a 100 millimetre aerofoil length, but is too long for typical aerofoil transverse dimensions which will generally only be in the order of 5 to 10 millimetres.

In the above circumstances, generally a compromise arrangement is achieved whereby much larger passages (5 to 10 millimetres diameter) are utilised. The larger passages are multi-passed with serpentine bends for triple and up to 5 passes in the same aerofoil. Such multi-passing achieves a greater pressure loss about the bends, but manufacture using ceramic cores with a lost wax casting process is well established. Cooling is supplemented by bleeding off air through film holes typically in the order of 0.5 millimetres diameter for limited dust blockage and with these film holes generally being 1.5 millimetres long, there is some convection cooling through these holes, but most of the cooling effect comes from bathing the outside of the aerofoil in locally cooler film. The film holes can only exit where there is a positive outward pressure drop and must avoid areas of high pressure drop because the film jets will draw off disproportionately coolant flow where there is a positive outward pressure drop. The film hole pressures on entry require the restriction of the interior passage flow speed to avoid pressure loss, this slower speed in turn reduces the convection cooling length of the interior passages.

Additional approaches to achieving high local cooling in hot areas include local impingement from jets from internal orifices, used in rows of impingement holes from internal pierced tubes or double wall construction. This approach gives intense local cooling, but the pressure drop is high and much of the pressure is lost in flow through the hole without doing useful work. With vanes with impingement tubes the tube is cooled unnecessarily. Furthermore all impingement approaches involve excess pressure loss which in itself can put a burden on the thermo dynamics cycle efficiency as the loss of pressure in the coolant flow does no useful work.

In short, it is desirable to achieve maximum cooling efficiency and previous systems have generally not maximised the proportionate cooling effect for coolant flow.

In accordance with the present invention there is provided a cooling arrangement for a component of a turbine engine, the arrangement comprising a fractal network of passage stages, each passage stage having a consolidated passage cross-section substantially consistent with other passage stages for flow pressure control across the fractal network.

Generally, the fractal network comprises fractal branching between passage stages. Typically, the branching is angled relative to previous stages for pressure control across the fractal network. Principally, the fractal network comprises a first primary passage stage formed by a single central core passage. Furthermore, a final passage stage in communication with a component surface includes surface fissure apertures for distribution of coolant flow to the surface of that component. Typically, the fractal network comprises four passage stages.

Also in accordance with the present invention there is provided a component for a turbine engine incorporating a cooling arrangement as described above.

Typically, that component is a turbine blade or a stator vane or a turbine gas path liner component in a turbine engine.

Generally, the surface fissure apertures are in the order of 0.5 millimetres in diameter for dust particle guarding.

An embodiment of the present invention will now be described by way of example and with reference to the accompanying drawing in which there is provided a schematic cross-section of an aerofoil.

As indicated above, adequate cooling of turbine engine components is necessary in order to achieve an acceptable operating temperature despite the physical limitations of the materials from which the components are made. A further consideration is the differing pressure presented particularly to blade aerofoils in such turbine engines such that a disproportionate fraction of the coolant air flow is drawn off in areas of relatively low impingement pressure in comparison with areas of high impingement pressure. Unfortunately, those areas of high impingement pressure may also be the ones subject to the highest gas flow temperatures as a result of the combustion process in the engines operation. Ideally, there should be a matching of the coolant flow with pressure region in order to achieve the most efficient use of the available coolant flow.

In accordance with the present invention a component contains repeating branched passages formed into passage stages. The consolidated cross-sectional area of the passages in each stage is substantially equalised in order to achieve coolant flow pressure control through a cooling arrangement comprising all of the passage stages. Thus, starting from a central core coolant passage, which defines a primary passage stage, there is branching into subsequent passage stages to achieve the desired coolant flow distribution. In effect a fractal distribution is provided between that primary passage stage and a final passage stage incorporating fissure apertures upon the surface of the component. Generally there will normally be at least one intermediate stage distinctly different from the primary stage and final stage in order to effect the necessary coolant flow distribution for reflection of the actual pressure drop and exit fissure apertures in terms of their density for best cooling of the component. As indicated, the component will normally be subject to varying external heat transfer factors, low pressure and interior stress fields in different regions of that component.

In terms of the above, the actual fractal network utilised will be dependent upon component dimensions, in particular depth and width. It should also be understood that generally the exit fissure apertures upon the component surface will have a size diameter determined in order to inhibit dust particle infusion. This size will generally be in the order of 0.5 millimetres, and as indicated previously, this renders the depth of the final passage stage can be no greater than 20 millimetres.

Although the substantive pressure drop at each passage stage is substantially equalised by providing the same approximate consolidated cross-sectional area for the passages in the stage, it will be understood by varying the number of exit passages in the final passage stage per unit surface area it is possible to provide higher coolant flow where heat flux (heat transfer and gas temperatures) are high. Similarly, by varying the length/diameter of the individual passages within a passage stage between the actual passage stages and branching at the passage stage interfaces, the pressure drop to the exit side can be higher in order to give similar coolant flow local pressure ratios at each exit fissure aperture/passage in the final stage.

By adjusting the passage diameters and branching, a prediction of internal heat transfer and coolant film development upon the component surface, it is possible to reduce the required exit passage density for effectiveness where the upstream exit film flow reduces the amount of lost coolant flow. It will also be understood that the fractal passage network would be arranged such that the passage stages achieve adjustment to the coolant flow such that there is less flow and less cooling where thermal stresses are lower upon the component in order to achieve a more uniform component life.

The passage network within the component such as a blade aerofoil will be of a relatively coarse distribution in order to minimise stress and load concentration of substantially radial loads. The attached drawing illustrates a schematic cross-section of a component such as a turbine blade aerofoil incorporating a fractal passage network in accordance with the present invention. Thus, the component 1 has a leading edge 2 which will generally be exposed to high pressure and a trailing edge 3 subject to lower pressures. In such circumstances, hot gas in the direction of arrowheads A will typically impinge upon the surfaces including the leading edge 2 such that these surfaces and parts of the component 1 become hotter in comparison with the surface incorporating the trailing edge 3.

Within the component 1 a fractal passage network is provided comprising a number of passage stages 4, 5, 6, 7, 8 which substantially radiate from a common primary or core passage stage 4. In accordance with the present invention each passage stage 4, 5, 6, 7, 8 is formed in order to achieve substantially the same pressure drop across its passage length. As indicated previously, pressure drop is a function of passage diameter as well as length. In such circumstances by appropriate choice of passage length and passage diameter in each stage 4, 5, 6, 7, 8 it will be understood that coolant flow through the passages can be appropriately presented upon the surface incorporating the leading edge 2 in comparison with the surface incorporating the trailing edge 3. As indicated previously, the leading edge surface will be of a higher pressure due to the incidence of the hot gas flow A so that coolant flow through the passages in the fractal passage network will be opposed by that relatively high pressure at the fissure apertures of the final stage 8. Generally, the pressure at side B will be lower and may even create a pressure imbalance such that cooling flow will be preferentially drawn through outlet fissure apertures from the final passage stage upon the surface incorporating the trailing edge 3 adjacent to the side B. In such circumstances as can be seen, the individual passage stages are accentuated such that there are more passages towards the leading edge 2 surface than the trailing edge 3 surface such that coolant flow is preferentially presented to the leading edge 2 surface. Clearly, the actual passage lengths and diameters in each stage will be determined by component dimensions, operating temperatures and performance criteria desirable for cooling within a turbine engine. The fractal passage network will generally be manufactured by a virtual pattern casting using an initial stereo lithography projection into an appropriate mould. It may be possible to prepare simplified versions of the passage network in accordance with the present invention utilising a conventional core and lost wax process, although such processes will need compromises with respect to the three dimensional shape to allow for mould die splitting and extraction. Although principally described with reference to a turbine engine blade aerofoil, it would be appreciated that other components in a turbine engine may incorporate cooling arrangements in accordance with the present invention. Thus, for example, stator vanes and NGV components as well as gas path liners may also incorporate cooling arrangements in which coolant flow utilisation is maximised with respect to those parts of the component subject to the highest temperatures. With respect to gas path liners within a turbine engine, the fact that one side of the liner will only be exposed to the hot gas in an arrangement of the passage network such that large feed passages start at the primary or fractal passage stage and subsequently pass coolant flow through the passage stages for presentation to that one side exposed to the hot gas. Furthermore, in addition to coolant flow, it will be appreciated that an arrangement in accordance with the present invention may also be utilised for distribution of lubricating fluids and to achieve through a presentation of a fuel surface burning.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A cooling arrangement for a component of a turbine engine, the arrangement comprising:
    a fractal network of passage stages, each passage stage having a consolidated passage cross-sectional area that is substantially equal with a consolidated passage cross-sectional area of other passage stages for flow pressure control across the fractal network.

2. An arrangement as claimed in claim 1, wherein the fractal network comprises fractal branching between passage stages.

3. An arrangement as claimed in claim 2, wherein the branching is angled relative to previous stages for pressure control across the fractal network.

4. An arrangement as claimed in claim 1, wherein the fractal network comprises a first primary passage stage formed by a single central core passage.

5. An arrangement as claimed in claim 1, wherein a final passage stage in communication with a component surface includes surface fissure apertures for distribution of coolant flow to the surface of the component.

6. An arrangement as claimed in claim 1, wherein the fractal network comprises four passage stages.

7. A component for a turbine engine incorporating cooling arrangement as claimed in claim 1.

8. A component as claimed in claim 7, wherein the component is one of a turbine blade, a stator vane and a turbine gas path liner component in a turbine engine.

9. A component as claimed in claim 7, wherein a surface of the component incorporates surface fissure apertures, and the surface fissure apertures are 0.5 millimeters in diameter for dust particle guarding.

10. A turbine engine incorporating the cooling arrangement as claimed in claim 1.

* * * * *